United States Patent [19]

Hed et al.

[11] Patent Number: 5,061,013

[45] Date of Patent: Oct. 29, 1991

[54] BICYCLE RIM AND WHEEL

[76] Inventors: Steven A. Hed, 1665 9th St. W., White Bear Lake, Minn. 55110; Robert B. Haug, 52 Malcom St., Minneapolis, Minn. 55414

[21] Appl. No.: 424,492

[22] Filed: Oct. 20, 1989

[51] Int. Cl.[5] .......................... B60B 5/02; B60B 21/00
[52] U.S. Cl. .................... 301/63 PW; 301/95; 301/104
[58] Field of Search ................. 301/54, 63 PW, 64 R, 301/67, 74, 95-98, 104, 105 B

[56] References Cited

U.S. PATENT DOCUMENTS

| | | |
|---|---|---|
| 697,118 | 4/1902 | Van Horn . |
| 810,860 | 1/1906 | Heart . |
| 1,968,005 | 7/1934 | Swain .............................. 301/6 A X |
| 1,969,088 | 8/1934 | Maranville ................... 301/37 R X |
| 3,452,798 | 7/1969 | Ravreby . |
| 3,656,531 | 4/1972 | Ross et al. . |
| 3,862,779 | 1/1975 | Jayne . |
| 4,280,736 | 7/1981 | Raudman . |
| 4,508,392 | 4/1985 | LeBlond et al. . |
| 4,639,046 | 1/1987 | Oleff et al. . |
| 4,732,428 | 3/1988 | Monte . |
| 4,793,659 | 12/1988 | Oleff et al. . |
| 4,844,552 | 7/1989 | Tsygankov et al. ....... 301/63 PW X |
| 4,919,490 | 4/1990 | Hopkins et al. .................. 301/95 X |
| 4,995,675 | 2/1991 | Tsai ................................ 301/63 PW |

FOREIGN PATENT DOCUMENTS

| | | |
|---|---|---|
| 3016862 | 11/1981 | Fed. Rep. of Germany ........ 301/63 PW |
| 2583680 | 12/1986 | France ........................... 301/63 PW |

OTHER PUBLICATIONS

Specialized Bicycle Components Accessory Catalog, 1990.
Hed Design 1989 Product Price List.
Zipp 3000 Composite Molded Wheel Specification Sheet.
Triathlete Magazine, p. 19, Jun. 1989.
Zipp 3000 Data Sheet.
Aerospoke Advertising Brochure.

*Primary Examiner*—Russell D. Stormer
*Attorney, Agent, or Firm*—Jenner & Block

[57] ABSTRACT

An improved bicycle rim and wheel having good aerodynamic properties and good crosswind stability is provided. In one embodiment, a toroidal rim is utilized to reduce the drag component normally associated with a conventional spoked wheel. The toroidal rim has a streamlined inner rim surface and a tire mounting surface. In other embodiments, drag reducing spoke systems are used in conjunction with a toroidal rim to lower wheel drag. In the preferred embodiments, the toroidal rim and wheel attached thereto form a transverse cross section which is substantially elliptical and has a high aspect ratio. The maximum rim width can be wider than the tire to achieve good aerodynamic efficiency.

36 Claims, 2 Drawing Sheets

U.S. Patent    Oct. 29, 1991    Sheet 1 of 2    5,061,013
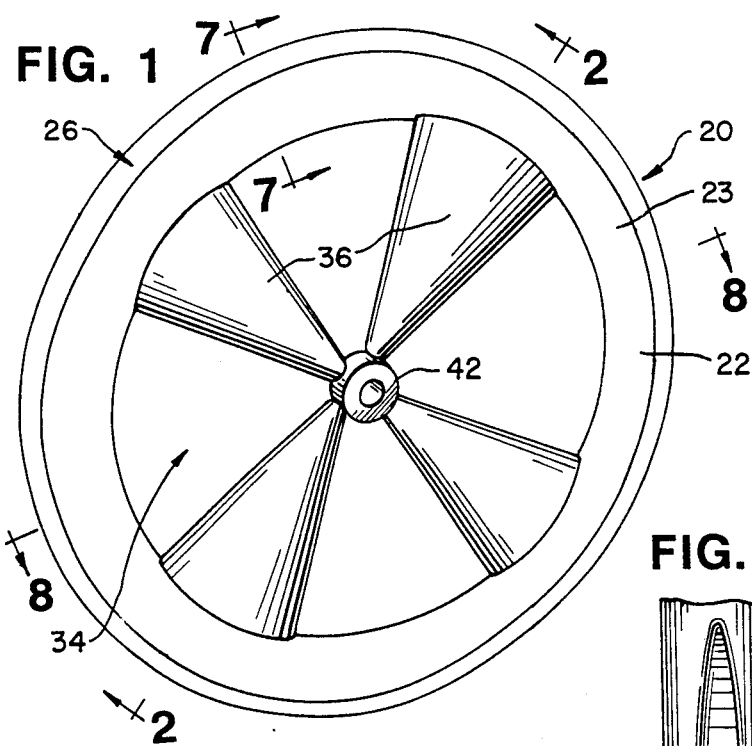
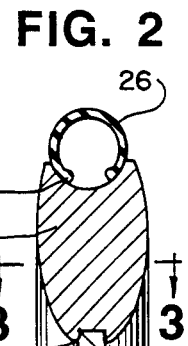
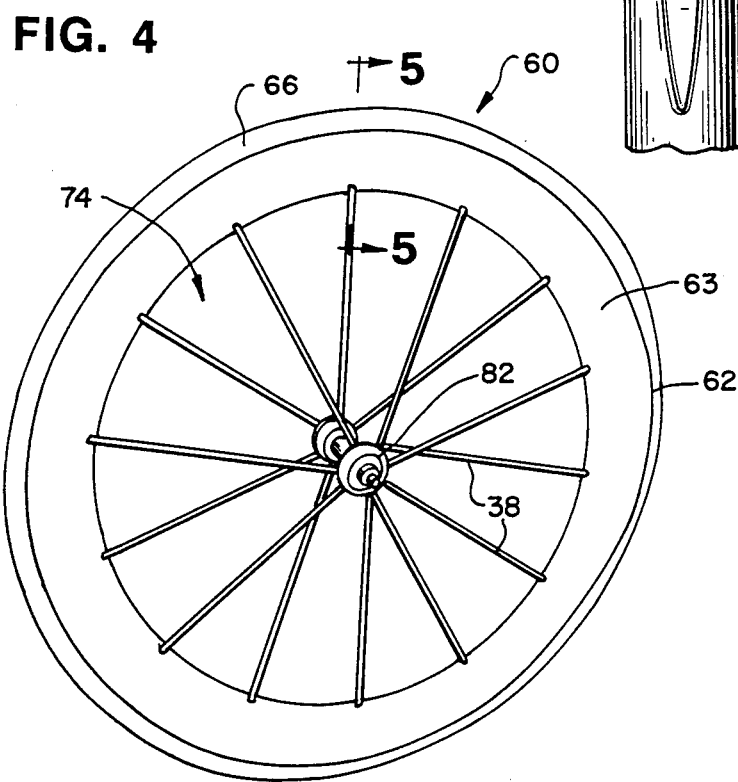
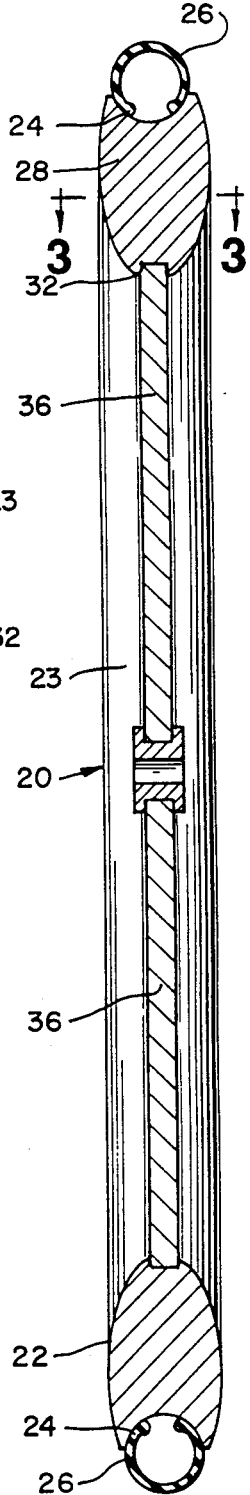

BICYCLE RIM AND WHEEL

FIELD OF INVENTION

The present invention relates to bicycle wheels. In one embodiment, a streamlined toroidal rim is used to minimize wheel-induced drag. In other embodiments, a streamlined toroidal rim is used in conjunction with a drag-reducing spoke configuration to minimize the drag inherent in traditional spoked wheels while maintaining crosswind stability.

BACKGROUND OF THE INVENTION

Propelling a bicycle requires a cyclist to exert a force sufficient to counteract several different types of forces which oppose the movement of the bicycle. A major force acting against movement is the drag induced by the bicycle's movement through the air. As a rider attempts to move faster, the drag forces become greater. Greater drag requires the rider to expend greater energy to overcome the drag. Thus, these forces become an important consideration in sports such as bicycle racing and triathlons.

A major source of drag in bicycle racing results from the flow of air over and around the bicycle wheels. Cyclists have attempted to reduce drag in wheels through the use of a "solid" or "disc" wheel. Such a wheel has no spokes, and thus eliminates the drag caused by the movement of air over the spokes and over and around the wheel rim.

Despite the apparent drag reducing advantage of solid wheels, many riders feel that the disadvantages inherent in such a structure render a solid wheel unsatisfactory for racing. The major source of this dissatisfaction stems from crosswind loading of the solid wheel. As wind forces perpendicular to the disc surface increase, an increased windloading force is transmitted from the disc surface to the bicycle handlebars. This requires the rider to apply a control force to the handlebars that varies as the windloading changes. Additionally, the force exerted by a sudden crosswind can destabilize the bicycle and rider and forward speed can be reduced.

Until recently, cyclists have been forced to choose either traditional spoked wheels with their inherent drag component or solid wheels with their inherent crosswind disadvantages. Recent attempts to reconcile these two types of wheels have led to a compromise wheel design. This design employs a limited number of solid spokes in conjunction with the bicycle rim. These wheels resemble a solid wheel with large "cutouts" in the disc to minimize the crosswind effects. Despite these efforts, the compromise designs can still suffer from objectionable crosswind windloading and drag and otherwise not have optimum aerodynamic or structural characteristics.

A need exists for a non-solid wheel with the low drag characteristics of a solid wheel. A need also exists for a wheel that is aerodynamic and has good crosswind stability.

SUMMARY OF THE INVENTION

In accordance with the present invention, a novel wheel is disclosed which mimics the low drag characteristics of the solid (non-spoked) wheel while providing good crosswind stability, such as the crosswind stability of a conventional spoked wheel. In accordance with the invention, a rigid toroidal rim is utilized to reduce the drag component normally associated with a spoked wheel. In another embodiment, a bicycle wheel employs a toroidal rim in conjunction with a reduced number of spokes to reduce wheel-induced drag.

More specifically, the toroidal rim of the invention comprises a circumferential tire mounting surface and a streamlined toroidal inner rim surface. The tire mounting surface supports and maintains the bicycle tire in proper position for contacting the surface over which the bicycle traverses, while the inner rim surface streamlines the airflow around the rim and provides a body for attaching wheel spokes thereto. The toroidal inner rim surface extends from a first edge of the tire mounting surface to a second edge of the tire mounting surface. The rim may have a hollow cavity that can be filled with a filling material if desired which can be a rigid material.

The toroidal transverse cross-sectional shape of the rim is preferably substantially elliptical and can also be substantially lenticular. The ratio of the maximum width of the rim to the tire diameter intended for the rim should be greater than 1 and preferably from about 1.05 to about 1.25 and most preferably from about 1.05 to about 1.15. Typically, the ratio should not exceed about 1.5.

In another embodiment, the toroidal rim described above is used in conjunction with a drag-reducing spoke system to further reduce wheel drag while maintaining crosswind stability.

In accordance with one aspect of the invention, a bicycle rim and wheel is provided that has lower drag than a standard spoked bicycle wheel.

In accordance with another aspect of the invention, a bicycle rim and wheel is provided that reduces drag without causing serious degradation of the crosswind handling characteristics of the bicycle.

In accordance with still another aspect of the invention, a strong, lightweight, wheel construction is provided which combines the advantages of standard spoked wheels with the advantages of solid wheels, while minimizing the inherent disadvantages of each. In addition, a wheel in accordance with the invention can be constructed with a small number of conventional bicycle wheel spokes. For example, 12 to 24 conventional spokes on a wheel of the present invention can be equivalent to a 32 spoke conventional bicycle wheel. A wheel in accordance with the invention can have as few as 8 conventional bicycle wheel spokes and still possess sufficient strength for use in bicycle races and triathlons.

In accordance with one aspect of the present invention, an aerodynamic bicycle wheel for mounting a tire thereto is provided that includes a rim composed of a circumferential tire mounting surface and a streamlined toroidal inner rim surface. The inner rim surface extends from a first edge of the tire mounting surface to the second or opposite edge of the tire mounting surface. A spoke system is provided that includes a plurality of spokes, which may be conventional bicycle wheel spokes with the spokes radiating from a hub at the center of the wheel toward the rim with the spokes being secured to the rim.

In accordance with still another aspect of the present invention, an aerodynamic bicycle wheel for mounting a tire thereto is provided that includes a rim having a circumferential tire mounting surface and a streamlined toroidal inner rim surface with the inner rim surface extending from a first edge of the tire mounting surface to a second or opposite edge of the tire mounting surface. The toroidal rim with a tire mounted thereto in position over the tire mounting surface provides a substantially elliptical transverse cross-sectional shape. The elliptical cross-sectional shape formed by the tire and rim cross section has an aspect ratio of between about 2.5 and 6. The streamlined inner rim surface may include a plurality of first apertures each having a spoke disposed therein and secured to the rim. An aerodynamic spoke system is provided that includes between 3 and 24 spokes with the spokes radiating from a hub at the center of the wheel toward the rim. The spokes can be round, flat or streamlined in transverse cross section and may include a threaded end portion or other suitable structure for securing the spoke to the rim. Each spoke passes through one of said first apertures with the spoke being internally secured to the rim by fastening means with the spoke securing structure being adjustable on the end of the spoke secured to the rim.

In accordance with one embodiment of the invention, the rim has an aspect ratio (the rim height to the rim width, as hereinafter described, in the range of about 2 to 5 and more preferably at least about 2.25). The maximum rim width to the intended tire width for a particular wheel in accordance with the invention is generally in the range of from about greater than or equal to 1 to about 1.5 and preferably as close to 1 as possible while providing a low system drag, which has been found to be in the range of from about 1.05 to about 1.15.

Since an elliptical or lenticular cross-sectional combined rim and tire shape is preferred, the maximum rim width should be greater than the tire diameter, a ratio of maximum rim width to tire diameter of at least about 1 to about 1.5, especially since the rim has a relatively large aspect ratio.

Other aspects and advantages of the invention will become apparent upon the following detailed description with reference to the drawings, like reference numerals referring to like parts.

BRIEF DESCRIPTION OF THE DRAWINGS

FIG. 1 is a perspective view of a bicycle wheel in accordance with the invention having a tire mounted thereon;

FIG. 2 is a cross section of the wheel depicted in FIG. 1 in the plane formed by the lines 2—2;

FIG. 3 is a fragmentary plan view of the streamlined inner rim surface taken along lines 3—3 of FIG. 2;

FIG. 4 is a perspective view of another embodiment of the wheel of the invention;

DESCRIPTION OF THE PREFERRED EMBODIMENT

Bicycle wheels have traditionally consisted of a plurality of spokes connected to a wheel hub at one spoke end and to a tire bearing rim at the other spoke end. This traditional design introduces unwanted turbulence around the bicycle wheel. This turbulence manifests itself as drag. Drag acts against the bicycle's motion through the air, thereby requiring a rider to expend additional energy to move through the air.

Figure 7:
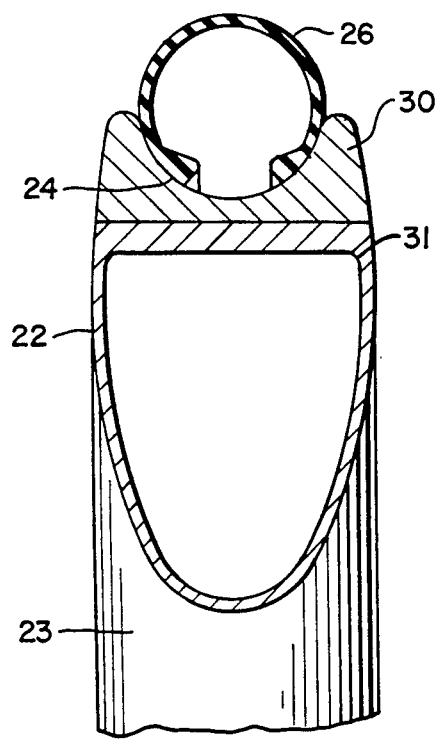
FIG. 7 is a cross section of the wheel of FIG. 1 in the plane formed by lines 7—7 shown without filling material.

Referring to the figures generally and in particular to FIGS. 1–3 and 7–8, a bicycle wheel 20 is depicted that includes a toroidal rim 22 having a streamlined inner rim surface 23 to reduce wheel drag. Bicycle wheel 20 further includes a hub 42, and a spoke system 34. FIG. 7 illustrates that toroidal rim 22 includes a tire mounting surface 24 and a streamlined inner rim surface 23. Member 30 is formed in two sections as hereinafter described. A tire 26 is mounted on tire mounting surface 24. Tire 26 can also incorporate a tube (not shown).

Figure 5:
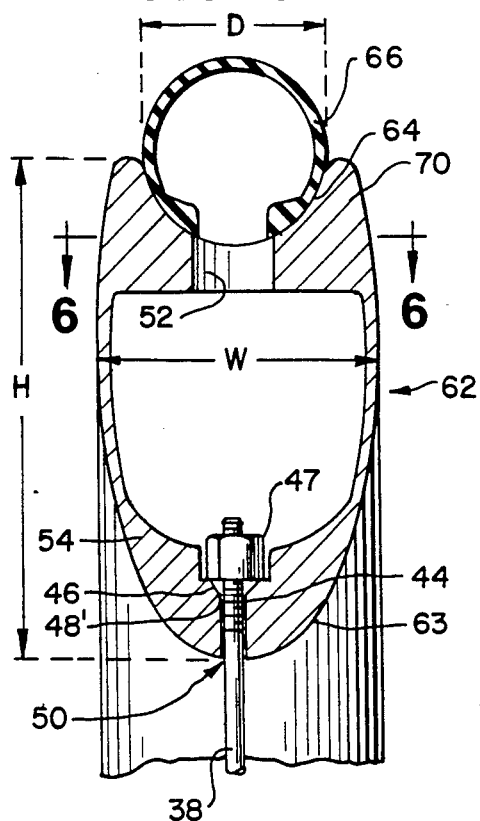
FIG. 5 is a cross section of the wheel depicted in FIG. 4 in the plane defined by lines 5—5.
Figure 6:
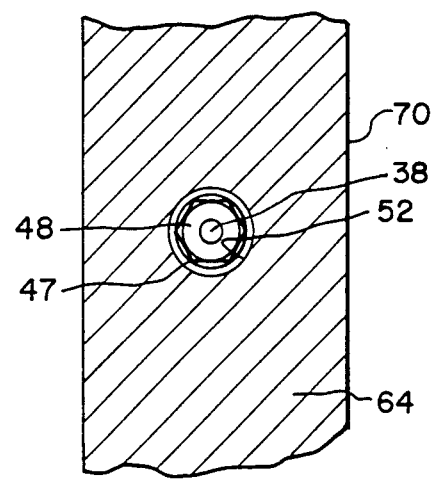
FIG. 6 is a fragmentary plan view of the tire mounting surface perpendicular to the plane formed by lines 6—6 in FIG. 5.

Referring to FIGS. 4–6, another bicycle wheel 60 in accordance with the invention is illustrated. Wheel 60 includes a rigid toroidal rim 62, a streamlined inner rim surface 63, a tire mounting surface 64 having a tire 66 mounted thereon, a rim reinforcing structure 70, a spoke system 74 and structure for securing spokes to rim 62 as hereinafter described and a hub 82. The components of wheels 20 and 60 can be similar except as described differently herein.

As used herein, toroid or toroidal means a surface generated by a plane closed curve rotated about a line that lies in the same plane as the curve but does not intersect it. Preferably, and as illustrated in FIGS. 5 and 7, the plane closed curve which generates the form of toroidal rim 62 and 22, respectively is substantially an ellipse which has been modified to generate a concave end at the tire mounting surface 24. A tire mounted to surface 24 makes the overall shape more elliptical or lenticular, and is believed to provide the lowest achievable system drag.

The major and minor cross-sectional dimensions of the toroidal rim define an aspect ratio. The aspect ratio of the rim, such as for rim 62, for example, is the ratio of the rim height (distance H in FIG. 5) to the rim width (distance W in FIG. 5). The rim height is defined as the maximum vertical rim dimension when the rim is oriented perpendicular to a horizontal plane. The rim width is the maximum horizontal dimension when the rim is oriented perpendicular to a horizontal plane. In the preferred embodiment, the toroidal rim and tire mounted thereto form a substantially elliptical cross section as depicted in FIG. 7, with the rim further having an aspect ratio ranging from about 2 to 5 and preferably at least about 2.25. Typically, and to obtain improved aerodynamic efficiency, the ratio of the maximum rim width W to the tire diameter D of FIG. 5 is in the range of from about 1 to 1.5 and preferably from about 1.05 to about 1.25.

While not wishing to be bound by theory, it is believed that good aerodynamic efficiency is achieved with the rim and wheels in accordance with the invention because the countervailing aerodynamic factors of minimum frontal area and laminar or smooth airflow are balanced.

Figure 8:
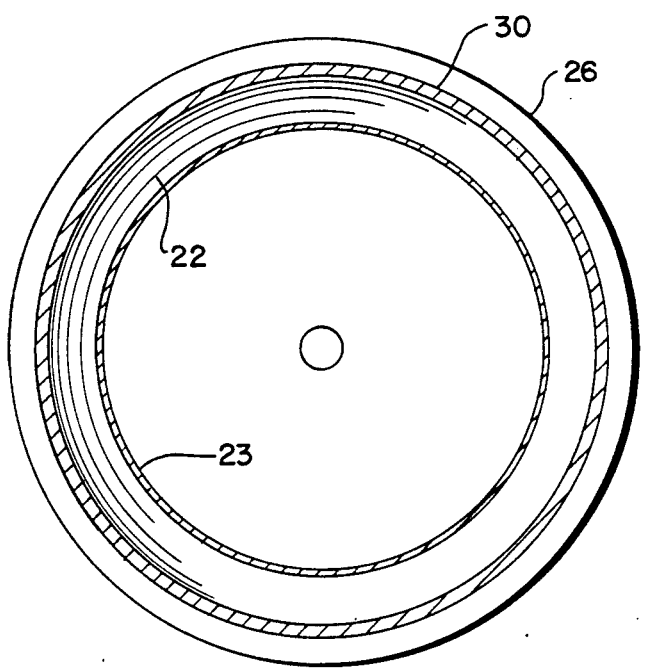
FIG. 8 is a cross section of the wheel rim of FIG. 1 taken at the plane formed by lines 8—8.

The toroidal rim of the invention can be constructed from a variety of materials, and can be a combination of them as for example composite and metal. For example, the tire mounting surface 24 and the upper portion of member 30 in FIG. 7 can be constructed of metal and the remainder of rim 22 including member 31, can be composite material. For example, any of the well-known composite materials, metals or alloys that have desired strength and toughness and that are otherwise suitable for bicycle wheels could be used. Furthermore, the interior of the rim can be solid, hollow, filled or reinforced as desired to obtain the desired strength, weight and cost. For example, FIGS. 7 and 8 show the use of an annular rim reinforcing member 30 within the rim which abuts the rim's outer perimeter. Surface 24 and member 30 may be an integral part of the remainder of rim 22 or may be a separate part. The entire volume of toroidal rim 22 may be filled with a filling media 28 as shown in FIG. 2. Both rim 22 and filling media 28 (a rigid foam material such as a urethane foam, for example) may be a high-strength, lightweight composite material which increases rim strength while only marginally increasing rim weight. For example, these components may be constructed of hand-laid fibers of high tensile strength and resistance to elongation such as Spectra (polyethylene) or an aromatic polyamide fiber such as Kevlar ® or of carbon or ceramics. Alternatively, the wheel might be produced as an integral unit by any injection molding process known in the art. Methods of using such materials to form wheels are well known in the art.

Typical sidewall rim thicknesses for Kevlar ® rims in accordance with the invention can be in the range of from about 0.015 to about 0.040 inches.

Toroidal rims 22 and 62 each have a spoke system 34 and 74, respectively. While rims 22 and 62 could be used with a large number of spokes approximating the number traditionally employed in bicycle wheels, typically about 32 to 36 spokes, the preferred embodiments employ a drag reducing spoke system. Spoke system 34 is illustrated in FIG. 1. In this embodiment, a plurality of spokes 36 having a major cross-sectional dimension in the plane of the wheel and a minor cross-sectional dimension perpendicular to the wheel radiate from hub 42 toward streamlined inner rim surface 23. Streamlined inner rim surface 23 comprises a plurality of recesses 32 for butt-joining spokes 36 to streamlined inner rim surface 23. Alternatively, the wheel of FIG. 1 might be produced as an integral unit by an injection molding or other process.

FIG. 4 illustrates wheel 60 in accordance with the invention that has a second type of drag-reducing spoke system 74 used in conjunction with wheel 60 and toroidal rim 62 which is similar to rim 22 except for spoke mounting provisions. In this embodiment, a plurality of conventional round metal bicycle spokes 38 radiate from hub 82 of conventional design. Other bicycle spokes could be used such as flat or streamlined spokes. Spokes 38 can comprise a threaded end portion 44 which can be used in conjunction with threaded spoke securing means 46 such as a nut 47 to secure spokes 38 to rim 62. In the embodiment shown in FIG. 5, an individual spoke passes through one of a plurality of first apertures 50 in inner rim surface 63. The spoke can then be secured inside toroidal rim 62 by a threaded nipple 48. Nipple 48 rests substantially within a complementary cavity 48' formed in support media 54 such that the nipple remains turnable within the cavity to allow the nipple to be threadably tightened on the threaded spoke end portion. A plurality of second apertures 52 in tire mounting surface 64, each radially spaced in line from a corresponding first aperture 50, allows access to the distal end of threaded nipple 48. A suitable tool (not shown) can be inserted through each of these second apertures 52 to turn the distal end of associated threaded nipple 48 so as to threadably move the nipple along the threaded spoke end portion to tighten the spoke to, or loosen the spoke from toroidal rim 62.

While wheel 60 is illustrated with fourteen conventional bicycle wheel spokes, it is to be understood that a fewer or greater number of spokes could be used. For example, a wheel with any number from 8–24 or more conventional bicycle wheel spokes could be utilized, depending on the load bearing requirements of the wheel. For most bicycle racers, about eight would be the minimum number of spokes that could be used.

While the invention is described in connection with preferred embodiments, it will be understood that it is not intended to limit the invention to cover these embodiments. On the contrary, it is intended to cover all alternatives, modifications and equivalents as may be included in the spirit and scope of the invention as described by the appended claims.

What is claimed is:

1. An aerodynamic bicycle wheel rim adapted for mounting a tire thereto comprising a circumferential tire mounting surface and a streamlined toroidal inner rim surface extending from a first edge of said tire mounting surface to a second edge of said tire mounting surface, the ratio of maximum width of said rim to the intended tire diameter being in the range of from 1.05 to 1.5.

2. The rim of claim 1 wherein the volume enclosed by said rim defines a hollow cavity.

3. The rim of claim 2 wherein the cavity is substantially filled with a filling material.

4. The rim of claim 2 wherein the cavity includes rim reinforcing means.

5. The rim of claim 1 wherein the aspect ratio of the rim is in the range of from about 2 to 5.

6. The rim of claim 1 wherein the transverse cross section formed by said rim and a tire mounted thereto is substantially elliptical.

7. The rim of claim 1 wherein the transverse cross section formed by said rim and a tire mounted thereto is substantially lenticular.

8. An aerodynamic toroidal bicycle wheel rim for mounting a tire thereto comprising a circumferential tire mounting surface and a streamlined inner rim surface, said streamlined surface extending from a first edge of said tire mounting surface to a second edge of said tire mounting surface, the transverse cross section formed by said rim and a tire mounted thereto having a substantially elliptical shape, said rim having a rim width greater than the maximum width of the tire mounted thereto.

9. The rim of claim 8 wherein said rim has an enclosed hollow portion.

10. The rim of claim 9 wherein said hollow portion is substantially filled with a filling material.

11. The rim of claim 8 wherein said rim has an enclosed hollow portion, said hollow portion containing a rim reinforcing means.

12. The rim of claim 11 wherein said tire mounting surface contains a plurality of second apertures, said second apertures each being radially spaced and in line with an associated one of said first apertures for providing access to said internal spoke securing means.

13. The rim of claim 8 wherein said streamlined surface comprises a plurality of recesses each for receiving the end of a spoke.

14. The rim of claim 8 wherein said streamlined surface comprises a plurality of first apertures whereby a wheel spoke can pass through said first aperture in said streamlined surface, said spoke internally within said toroidal rim by an internal spoke-securing means.

15. The rim of claim 8 wherein the aspect ratio of said rim ranges from 2 to 5.

16. An aerodynamic bicycle wheel for mounting a tire thereto comprising:
   a rim comprising a circumferential tire mounting surface and a streamlined toroidal inner rim surface, said inner rim surface extending from a first edge of said tire mounting surface to a second edge of said tire mounting surface, said rim having an aspect ratio in the range of from about 2 to 5 and having a rim width greater than the maximum width of the tire mounted thereto; and
   a spoke system comprising a plurality of spokes, said spokes radiating from a hub at the center of said wheel toward said rim, said spokes being secured to said rim.

17. The wheel of claim 16 wherein said spokes have a major cross-sectional dimension in the plane of said wheel and a minor cross-sectional dimension perpendicular to the plane of said wheel.

18. The wheel of claim 17 wherein said spokes are substantially elliptical in transverse cross section.

19. The wheel of claim 16 wherein said spokes are round in cross section and comprise threaded end portions at the spoke ends nearer said rim.

20. The wheel of claim 16 wherein said spokes are conventional round bicycle wheel spokes.

21. The wheel of claim 20 wherein said wheel has from about 8 to 24 of said conventional spokes.

22. The wheel of claim 16 wherein said streamlined inner surface contains a plurality of first apertures, each spoke extending through a first aperture in said streamlined inner rim surface, said spoke internally secured to said rim by a threaded spoke-securing means, said securing means threadably adjustable on said threaded end portion within said rim.

23. The wheel of claim 22 wherein said threaded securing means comprise a plurality of spoke nipples, said nipples located within the volume enclosed by said rim.

24. The wheel of claim 22 wherein said tire mounting surface contains a plurality of second apertures, each being radially spaced in line with an associated one of said first apertures for providing access to said threaded spoke securing means.

25. The wheel of claim 16 wherein the aspect ratio of said rim is greater than about 2.25.

26. The wheel of claim 16 wherein said toroidal rim and tire mounted thereto is substantially lenticular in transverse cross section.

27. The wheel of claim 16 wherein said toroidal rim and tire mounted thereto is substantially elliptical in transverse cross section.

28. The rim of claim 16 wherein the rim width is greater than the width of a tire mounted thereto.

29. An aerodynamic bicycle wheel for mounting a tire thereto comprising:
   a rim comprising a circumferential tire mounting surface and a streamlined toroidal inner rim surface, said inner rim surface extending from a first edge of said tire mounting surface to a second edge of said tire mounting surface, said toroidal rim and tire mounted thereto being substantially elliptical in transverse cross section, the elliptical cross section formed by said tire and rim cross section further having an aspect ratio between 2.5 and 6, said streamlined inner rim surface further comprising a plurality of first apertures each allowing a spoke to be disposed therein, said rim further having a rim width greater than the maximum width of the tire mounted thereto; and
   an aerodynamic spoke system comprising between 3 and 24 spokes, said spokes radiating from a hub at the center of said wheel toward said rim, said spokes comprising a fastenable end portion at the spoke end nearer the rim, each of said spokes passing through a different one of said first apertures, each of said spokes internally secured to said rim by spoke securing means, said spoke-securing means being adjustable on said fastenable end portions within said rim such that said spokes can be secured to said rim.

30. The wheel of claim 29 wherein said tire mounting surface contains a plurality of second apertures for providing access to said spoke securing means.

31. The wheel of claim 30 wherein the width of said rim is greater than the width of a tire mounted thereto, said apertures providing access to said threaded spoke securing means.

32. The wheel of claim 29 wherein said spokes are conventional bicycle wheel spokes.

33. The wheel of claim 32 wherein said wheel has from eight to eighteen of said conventional bicycle wheel spokes.

34. An aerodynamic bicycle wheel rim and tire combination comprising:
   a tire;
   a circumferential tire mounting surface, having the tire mounted thereon, and a streamlined toroidal inner rim surface extending from a first edge of said tire mounting surface to a second edge of said tire mounting surface, the ratio of maximum width of said rim to the intended tire diameter being in the range of from 1.05 to 1.5.

35. An aerodynamic toroidal bicycle wheel rim and tire combination comprising:
   a tire;
   a circumferential tire mounting surface, having the tire mounted thereon, and a streamlined inner rim surface, said streamlined surface extending from a first edge of said tire mounting surface to a second edge of said tire mounting surface, the transverse cross section formed by said rim and the tire mounted thereto having a substantially elliptical shape, said rim having a rim width greater than the maximum width of the tire mounted thereon.

36. An aerodynamic bicycle wheel for mounting a tire thereto comprising:
   a tire;
   a rim comprising a circumferential tire mounting surface, having the tire mounted thereon, and a streamlined toroidal inner rim surface, said inner rim surface extending from a first edge of said tire mounting surface to a second edge of said tire mounting surface, said rim having an aspect ration in the range of from about 2 to 5 and having a rim width greater than the maximum width of the tire mounted thereon; and
   a spoke system comprising a plurality of spokes, said spokes radiating from a hub at the center of said wheel toward said rim, said spokes being secured to said rim.

* * * * *

UNITED STATES PATENT AND TRADEMARK OFFICE
CERTIFICATE OF CORRECTION

PATENT NO. : 5,061,013

DATED : October 29, 1991

INVENTOR(S) : Hed et al.

It is certified that error appears in the above-identified patent and that said Letters Patent is hereby corrected as shown below:

Col. 6, lines 25 and 26, delete "volume enclosed by said rim defines a hollow cavity" and insert therefor --toroidal inner rim surface defines an enclosed volume that is a hollow cavity--; and line 67, after "internally" insert --secured--.

Col. 8, line 59, delete "ration" and insert therefor --ratio--.

Signed and Sealed this

Ninth Day of March, 1993

Attest:

STEPHEN G. KUNIN

Attesting Officer

Acting Commissioner of Patents and Trademarks